Patented Dec. 12, 1944

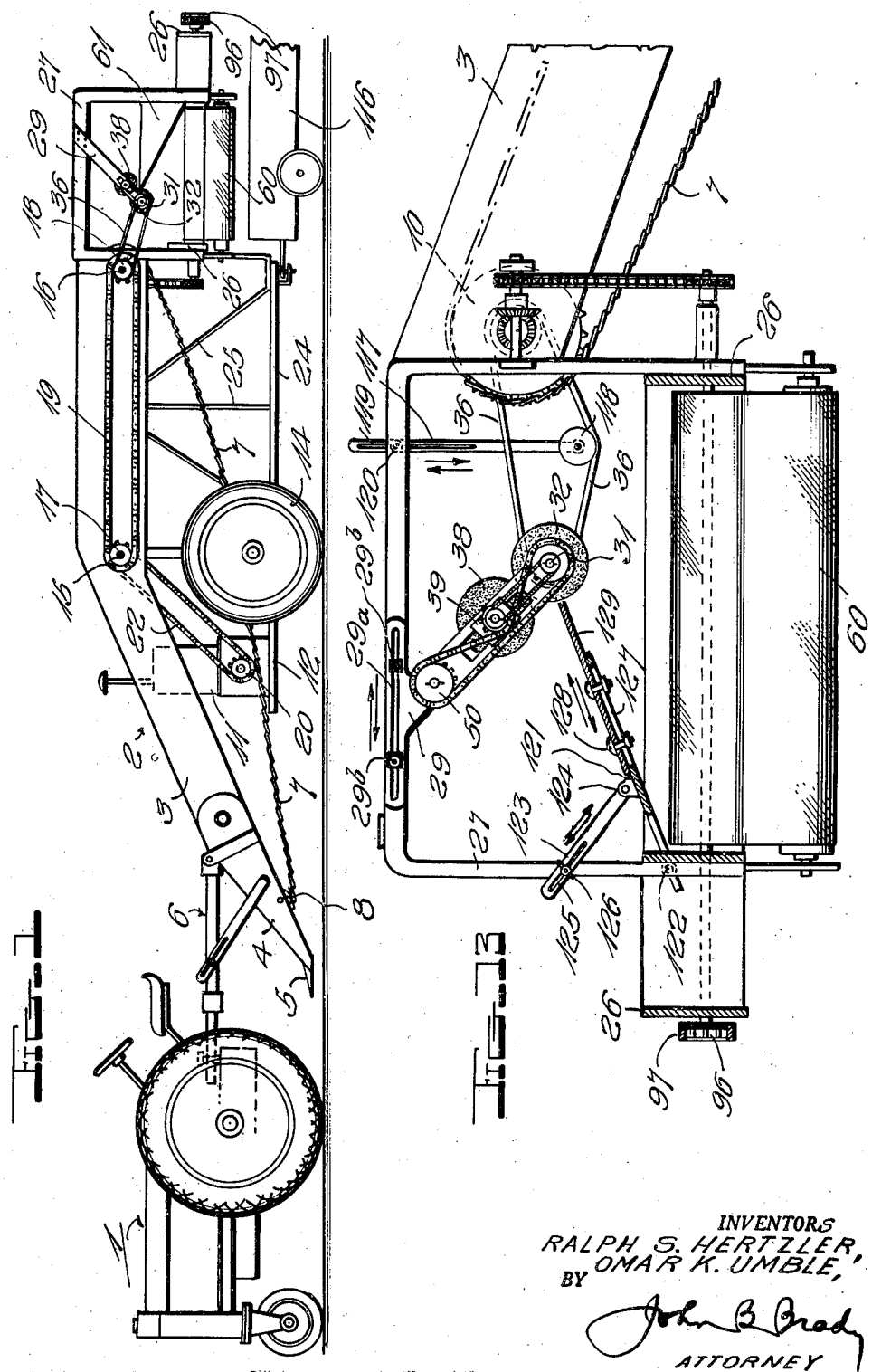

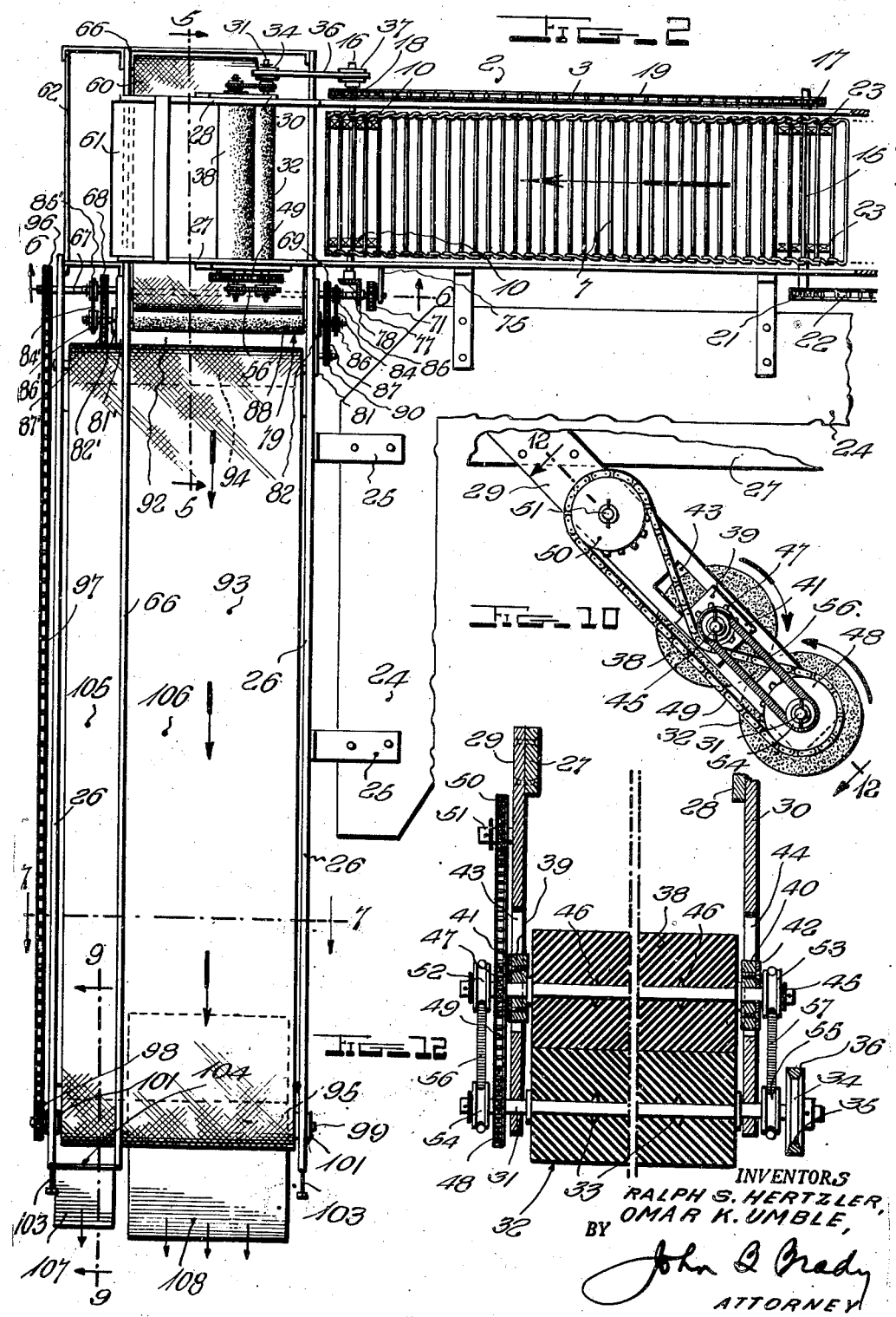

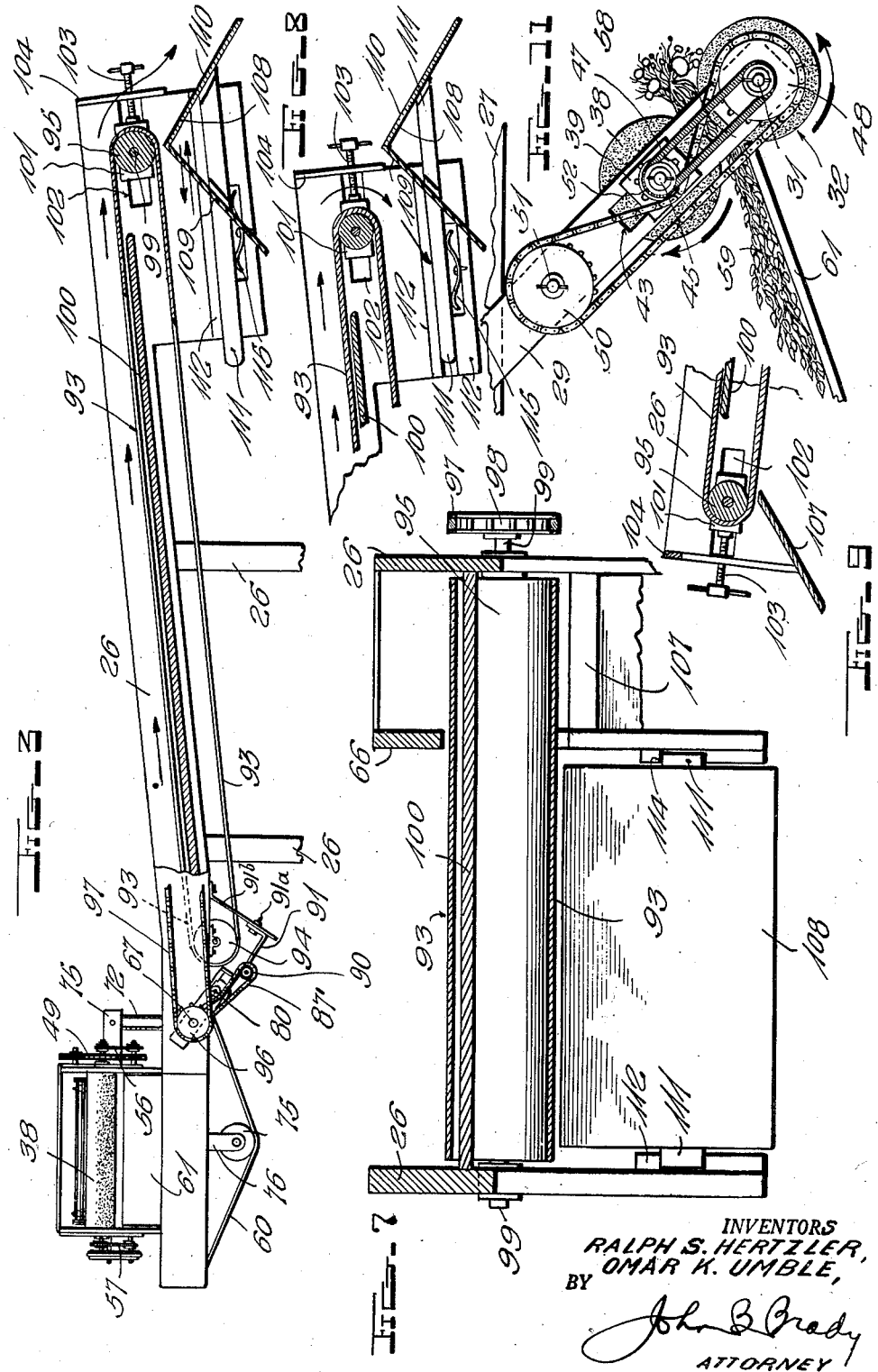

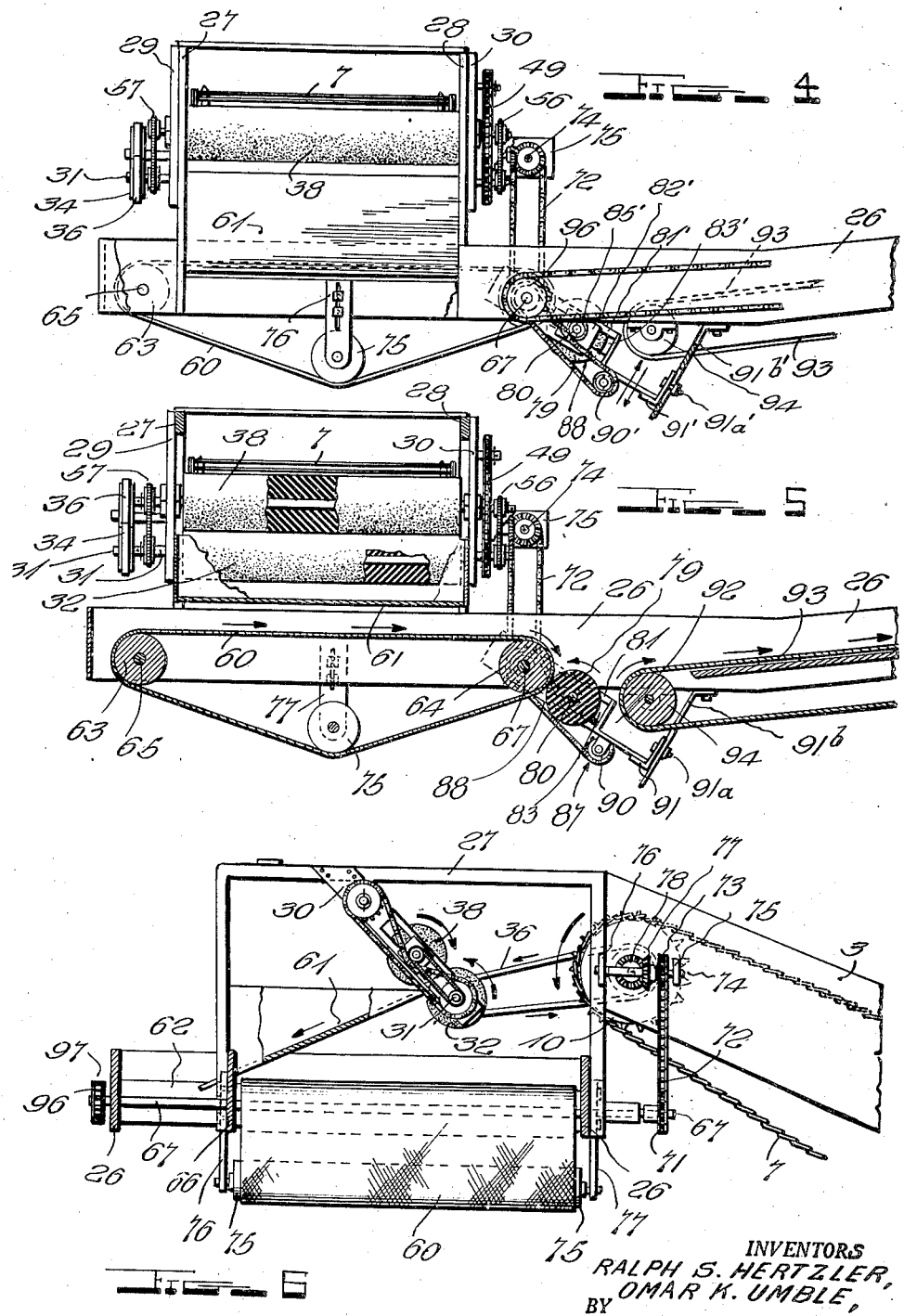

2,365,077

UNITED STATES PATENT OFFICE 2,365,077

POTATO HARVESTING MACHINE

Ralph S. Hertzler, Elverson, and Omar K. Umble, Atglen, Pa.

Application October 28, 1943, Serial No. 507,978

6 Claims. (Cl. 130—30)

Our invention relates broadly to harvesting machinery and more particularly to an improved construction of potato harvester.

One of the objects of our invention is to provide an improved construction of potato harvester in which potatoes dug from the fields may be separated from attached vines and accompanying stones and undersized potatoes and collected for marketing.

Another object of our invention is to provide a construction of potato harvesting machine having positive drive means associated with conveyor mechanism for elevating potatoes dug from the field, separating potatoes from undersize stones and potatoes, removing attached vines and delivering potatoes of selected size for marketing.

Still another object of our invention is to provide a positively driven potato harvesting mechanism in which potato vines attached to the potatoes may be readily removed and the potatoes classified as to size and collected for marketing.

A further object of our invention is to provide a construction of potato harvesting machine in which a set of adjustable rolls are mounted in position with respect to a conveyor mechanism for gripping the vines attached to potatoes as they are elevated immediately after digging from the field for stripping the potatoes from the vines and delivering potatoes of selected size to a collector for marketing.

A still further object of our invention is to provide a mechanism for mounting a set of stripping rolls on a potato harvester whereby the rolls may be adjusted in a position according to the average growth of the potato vines in the fields to be harvested for more effectively stripping the potatoes from the vines and collecting the potatoes for harvesting.

Another object of our invention is to provide an arrangement of stripping rolls for a potato harvesting machine in which the rolls are positively and continuously driven independently of obstructions which may be produced by the passage of the potato vines through the stripping rolls for insuring the more effective removal of potatoes from the potato vines for collection and marketing.

Still another object of our invention is to provide an arrangement of collecting means for potatoes movable to selected positions for excluding debris, stones and undesired material from the potato collecting means by directing the debris, stones and undesired material away from the potato collecting means at times when it appears that the harvesting machine may be receiving more stones, debris and undesired material than potatoes.

Other and further objects of our invention reside in the details of construction of the potato harvester as set forth more fully in the specification hereinafter following by reference to the accompanying drawings, in which:

Figure 1 is a side elevational view of the potato harvester of our invention shown connected to a tractor for drawing the harvester over the field for plowing the potatoes for action of the harvesting machine thereon; Fig. 2 is a plan view of a fragmentary portion of the potato harvesting machine showing the relationship of the conveying mechanism to the potato vine stripping rolls of our invention; Fig. 3 is an end view of the potato vine stripping rolls with the associated conveyor leading to the potato collecting means, having parts broken away and illustrated in longitudinal section; Fig. 4 is an enlarged end view of the potato vine stripping rolls and the associated drive mechanism associated therewith and illustrating the relation of the potato vine stripping rolls to the conveyor that carries the potatoes to the potato collecting means; Fig. 5 is a transverse sectional view taken substantially on line 5—5 of Fig. 2 and illustrating the potato vine stripping rolls partially in section and the relationship thereof to the conveying means leading to the potato collecting means; Fig. 6 is a transverse sectional view taken substantially on line 6—6 of Fig. 2 and illustrating the relation of the potato vine stripping rolls to the end of the elevator conveyor with respect to the end of the elevator conveyor leading from the plow section of the harvester; Fig. 7 is a transverse sectional view on line 7—7 of Fig. 2 illustrating the arrangement of the conveyor leading to the potato collecting means; Fig. 8 is a fragmentary sectional view showing one of the extreme positions of the director means in the potato collecting end of the harvester; Fig. 9 is a fragmentary sectional view illustrating one form of means we employ for adjusting the tension of the conveyor leading to the potato collecting means; Fig. 10 is an enlarged end elevational view showing the interconnecting means of the potato vine stripping rolls provided by our invention; Fig. 11 is a view illustrating the operation of the potato vine stripping rolls for removing potatoes from the potato vine in the harvester of our invention; Fig. 12 is a transverse sectional view taken substantially on line 12—12 of Fig. 10 and showing the floating bearing construction of the potato vine stripping rollers which is a special feature of our invention; and Fig. 13 shows a modified arrangement of stripping rolls showing the relation of the stripping rolls with respect to the end of the conveyor leading from the plow end of the harvester and showing particularly the adjustability of the rolls and mechanism associated therewith for adapting the harvester for the most efficient operation in various localities depending upon the growth of the potato vines in the potato fields in which the harvester is to be used.

Referring to the drawings in detail, reference character 1 designates a standard tractor which is coupled with the potato harvesting machine of our invention which we have shown generally at 2. The potato harvesting machine comprises a frame structure 3 to which is pivotally mounted at the front thereof a plow carrier 4 having plow teeth 5. The plow carrier 4 may be lowered in position through suitable lever arrangements restricted by suitable guide means represented generally at 6 to enable the plow teeth 5 to project below the surface of the soil for plowing up the rows of potatoes in the field and enclosing between the side walls of the carrier 4 the potatoes and vines attached thereto which may be picked up and conveyed upwardly between the side walls of frame 3 by the continuously moving conveyor represented at 7 in Fig. 2. The conveyor 7 travels over the guide roller 8 journaled between the side members 4 and over intermediate sprocket wheels 23 carried by shaft 15 journaled in frame 3 and over sprocket wheels 10 carried by shaft 16 journaled in frame 3 adjacent the top of the harvester. The conveyor 7 returns below the frame 3 as shown in Fig. 1 and operates in continuous motion so long as engine 11 is being operated. Engine 11 is suitably supported on the chassis 12 of the harvester which is in turn supported by wheels 14 carried by a transverse axis in a position in which the harvester is substantially balanced about the transverse axis with a slight overbalance condition on the plow point end of the structure tending to maintain the plow point in engagement with the earth by the weight of the harvester. The tractor 1 when coupled to the frame 3 of the harvester sufficiently elevates the plow point 5 to enable the plow point 5 to remain out of engagement with the earth until adjusted to the desired angular position under control of the adjusting guide 6. The frame 3 provides journalling means for transverse shafts 15 and 16 which project beyond frame 3 and carries sprocket wheels thereon indicated at 17 and 18 interconnected by chain 19 which drives the endless conveyor 7. Engine 11 is coupled with a suitable driving means on shaft 15 which we have indicated in the form of a sprocket wheel 21 connected with sprocket wheel 20 on engine 11 through chain 22. Thus endless conveyor 7 is positively moved continuously over rollers 8, sprocket wheels 23 carried by shaft 15 and sprocket wheels 10 carried by shaft 16.

Potatoes, stones, dirt, debris and potato vines which are plowed up by plow point 5 engaged below the surface of the earth and pulled forward by tractor 1, are thus elevated by endless conveyor 7. It will be observed that the endless conveyor 7 is composed of spaced parallel bars linked together at their extremities to form a continuous support. The bars are so spaced, however, that stones, dirt, debris and undersized potatoes may fall through the conveyor as the harvester progresses through the field subject to all of the shock and vibration incidental to the operation of engine 11 and the generally rough terrain over which the harvester must operate.

A platform shown at 24 is supported on the chassis of the harvester and extends both longitudinally and transversely of the harvester enabling attendants to walk along the platform while the harvester is being drawn by the tractor 1 to remove obstructions from the conveyor mechanism and throw off any large oversize rocks or accumulation which may tend to impair the continuous operation of the machine. A suitable frame structure 25 serves to support the platform 24 with respect to the chassis of the harvester and with respect to the wheels 14 which are symmetrically arranged on opposite sides of the harvester for supporting the mass of the harvester in substantially balanced condition as hereinbefore explained.

The harvester is provided with a transversely extending frame 26 which is supported by the chassis of the harvester along an axis which is substantially normal to the axis of the elevating conveyor 7 as shown more clearly in Fig. 2. Intermediate the transversely extending frame structure 26 and the frame structure 3 of the conveyor we arrange the potato vine stripping mechanism which is an important feature of our invention. The potato vine stripping mechanism is supported by frame members 27 and 28 which project upwardly from side frames 3 of the elevating conveyor 7 and serve to support bearing brackets 29 and 30 in which the potato vine stripping rolls are journalled. We have developed the journalling arrangement for the potato vine stripping rolls very carefully as this is one of the essential features for insuring continuous and rapid action of the harvester. As shown more particularly in Figs. 10, 11 and 12, a shaft member 31 is journalled between brackets 29 and 30 and carries a yieldable roll 32 thereon formed from rubber, synthetic composition rubber or other yieldable plastic material which is fused or otherwise secured to the shaft 31 and maintained in position to rotate therewith. To prevent relative rotation between the material of the yieldable roll 32 and the shaft 31, we may provide projections 33 on shaft 31 which extend into the material of the roll forming a connection therewith. It is also entirely practicable to form shaft 31 of polygonal section to eliminate the tendency of relative rotation between the shaft and the yieldable roll 32. The projecting end of the shaft 31 carries a pulley member 34 having a recessed peripheral face 35 for receiving a correspondingly shaped belt 36 which is driven from pulley 37 carried by shaft 16 journalled in frame structure 3 of the harvester. Belt 36 is formed from rubber, synthetic rubber or other yieldable material and is capable of providing a slip drive connection in the event of obstructions accumulating at the vine stripping rolls as will be hereinafter explained more fully.

The yieldable roll 32 coacts with a similar yieldable roll 38 which is journalled at opposite ends in slidable bearing members 39 and 40. Each of the bearing members 39 and 40 are provided with guide plates 41 and 42, respectively, which serve to maintain the bearing members 39 and 40 within slots 43 and 44 formed in the bracket members 29 and 30, respectively. Bearing members 39 and 40 substantially float in the slots 43 and 44 in brackets 29 and 30 while being accurately aligned at all times by the over-lap of the plates 39 and 42 with respect to the bracket members 29 and 30. The roll 38 is supported by shaft 45 which is intimately connected with roll 38 by fusing of the roll to the shaft and otherwise interconnecting the roll and the shaft through projections 46 or by shaping the shaft in polygonal section. Shaft 45 thus floats in bearings 39 and 40 and is positively driven from a sprocket wheel 47 carried by the shaft 45 in a direction opposite to the direction of drive of shaft 31 so that rollers 32 and 38 drive toward each other immediately adjacent the delivery end of the conveyor 7. This is accomplished by positively driving each roll. Roll 32 is positively driven from belt driven pulley 34 which drives sprocket wheel 48 on the end of shaft 31 which is engaged by chain 49. Chain 49 is looped over one side of sprocket wheel 47 as shown in Figs. 10 and 11 and passes around idler sprocket wheel 50 rotatively journalled at 51 on bracket 29. Thus the slip drive through pulley 34 operates to positively drive rolls 32 and 38 in counterclockwise and clockwise directions respectively in a position in which the rolls tend to grab the potato vines as they appear at the upper end of the conveyor 7. The shaft 45 of roller 38 also carries loosely mounted collar members 52 and 53 within which shaft 45 is free to revolve. Shaft 31 also carries similar loose fitting collar members 54 and 55 within which shaft 31 freely revolves. The periphery of the collar members are so shaped that spring belts shown at 56 and 57 may be looped over the aligned collar members 52–54 and 53–55, respectively, tending to maintain the yieldable rollers 32 and 38 in intimate surface contact but free to operate in the event that an unusually large obstruction tends to pass between the rolls. Under such conditions the floating bearings 39 and 40 slide in slots 43 and 44, displacing roll 38 from roll 32 while continuing the positive drive of the rolls. Positive drive of roll 38 continues independently of the spacial relation of the rolls 38 and 32 as chain 49 is continuously in engagement with the teeth of sprocket wheel 47 even though roll 38 and sprocket wheel 47 may be displaced upwardly along the slot 43 in bracket 29. The bands 56 and 57 tend to continuously urge rolls 32 and 33 into intimate contact opposing separation of the rolls and increasing the effectiveness of the rolls in stripping off potatoes represented at 58 in Fig. 11, from the potato vines, shown at 59 in Fig. 11, that pass between the rolls 32 and 38.

As shown in Fig. 6, the rolls 32 and 38 are supported at the required distance from the end of the elevating conveyor 7 to grip the potato vines and draw the potato vines between the rolls 32 and 38 as shown in Fig. 11 for stripping off the potatoes which adhere to the vines, which potatoes drop to an endless conveyor 60 of suitable material such as canvas mounted beneath the rolls. The potato vines, debris, stones and undesired material which may be pulled by the rolls 32 and 38 are discharged down an inclined chute 61, and fall through an open frame indicated at 62 as an extension from frame 26. If desired a collector in the form of a wagon or in the form of bags may be attached to the harvester below the position 62 for collecting the vines, stones and debris.

The conveyor 60 which receives the potatoes stripped from the vines by rolls 32 and 38 is supported by transversely extending roller members 63 and 64 which are journalled at opposite ends between the sides of frame 26. Shaft 65 is journalled at one end in side frame 26 and at the other end in intermediate frame 66 supported by the chassis. Shaft 67 carrying roller member 64 is also journalled at one end in side frame 26 and at the opposite end in intermediate frame 66 and projects beyond the opposite side frame 26 carrying sprocket wheels 68 and 69 thereon adjacent one end and sprocket wheel 71 adjacent the opposite end. In order to impart the required tension to endless conveyor 60, we provide an adjustable roll 75 adapted to be varied in position with respect to conveyor 60 for controlling the tension on the conveyor. Adjustable roll 75 is carried by adjustable brackets 76 and 77 adjustably secured to one of the side frames 26 and the intermediate frame 66. Shaft 67 is positively driven from sprocket wheel 71 which is engaged by chain 72 which is driven by sprocket 73 on shaft 74 which is journalled between bracket 75 and supporting member 76 carried by one of the side frame members 27. Shaft 74 carries bevel gear 77 which meshes with bevel gear 78 carried by driven shaft 16 whereby movement is imparted to the conveyor 60. A yieldable roll 79 is carried by shaft 80 and journaled at opposite ends in bracket members 81. The yieldable roll 79 is mounted in a manner similar to the mounting of roll 38 in that roll 79 is supported by floating bearing members represented at 82' in Fig. 4 that are slidable in slots represented at 83' for bracket 81' in Fig. 4. In order to maintain yieldable roll 79 in surface contact with belt 60 as it operates over roller 64, we provide an arrangement of resilient bands similar to that described in connection with Figs. 10, 11 and 12, that is, spring bands 84 operate over collar members represented at 85 and 86 arranged loose on shafts 67 and 80 for maintaining yieldable roller 79 into surface contact with belt 60. Roller 79 is driven by chain 87 which engages sprocket wheel 86 thereon and which operates over sprocket wheel 69 carried by shaft 67 and over idler sprocket 90 carried by adjustable bracket support represented at 91. The adjustable bracket support 91 is adjustable in position under control of bolt device 91a which is selectively fixed in the slotted depending arm 91b secured to frame 3. The arrangement of sprockets, chains, floating bearing and associated parts heretofore described are duplicated at the opposite ends of the roll and we have indicated corresponding parts by corresponding primed reference characters as for example at 81', 82', 83', 85', 90', 91', 91a', 91b', etc. Thus the vines which may have fallen through the space between the upper end of conveyor 7 and the set of rollers 32 and 38 may be discharged between conveyor 60 and the yieldable roller member 79. Surface 88 of roller member 79 is pliable and resilient and serves to clean the potatoes that are delivered to the delivery conveyor we have represented at 93. Also, undersize potatoes, stones and debris may also be eliminated through the space provided at 92 between the adjustably mounted yieldable roller 79 and the lower end of the delivery conveyor. Delivery conveyor 93 is formed from canvas or other flexible material.

The delivery conveyor 93 is supported on rollers 94 and 95 journaled in the side frames 26—26. The conveyor is driven by a sprocket wheel 96 carried by shaft 67 and engaging sprocket chain 97 which operates over sprocket wheel 98 on the end of shaft 99 supporting roller 95. The delivery conveyor 93 operates over the transversely extending frame portion 100 extending between the side frames 26 and returns beneath the transversely extending portion 100 for effecting continuous operation. The tension on the endless conveyor belt 93 is controlled by an adjustable bearing support for shaft 99 which carries roller 95. The bearing support is represented at 101 operative in slots 102 formed in the opposite side frames 26. Adjustable screw members 103 pass through end plates 104 associated with the side frame members 26 for adjusting the position of the roll 95 with respect to the upper end of the conveyor.

It will be observed that the intermediate frame 66 extends in the form of a partition longitudinally of the conveyor. This divides the delivery conveyor into two sections represented at 105 and 106. Section 105 may then be used as an area into which debris, stones, broken portions of vines and undersize potatoes and undesired material may be thrown between attendants who walk along platform 24 while the harvester is in operation. The undersize potatoes, debris, broken vines and undesired material thrown into section 105 may then be discharged down chute 107 shown in Figs. 2 and 9. Chute 107 is stationary adjacent the end of the conveyor 93 for discharging material directly beneath the end of the conveyor into bags or a collector or directly onto the field.

A slidable arrangement of adjustable chute is provided for the main section 106 of the delivery conveyor as represented in Figs. 2, 3, 7 and 8. The chute 108 is provided with oppositely directed inclined faces 109 and 110 which are supported on the slide 111 which is supported by one side wall of the frame at 26 and by the intermediate partition 66. The support 111 for the chute slides within grooves 112 and 114 in members which form continuations of one of the side frames 26 and intermediate partition 66. These slides formed at the sides of the frame 26 and intermediate frame 66 include spring means 115 which tend to frictionally grip the adjustable supports 111 and retain the chute in the position in which it is moved. Thus in the position illustrated in Fig. 3 the chute directs potatoes from the delivery end of the conveyor into a potato collector such as a bag hung from the harvester or a low truck indicated in broken lines at 116 in Fig. 1, which may be drawn behind the harvester. When, however, it is found that a large amount of material being delivered may be rocks, debris or undesired material, chute 108 is shifted to the position illustrated in Fig. 8 whereupon the rocks, debris and undesired material is directed away from the collector and drops beneath the harvester and does not fall in the collector. As soon as the run of potatoes is again restored the chute 108 is shifted back to the position illustrated in Fig. 3 and collection of the potatoes proceeds. This condition may be often encountered in a field where the harvester may approach an area where the growth of potatoes may have been poor and where there are excessive weeds, rocks, small size potatoes or undesirable material which it is not desired to have fall into the collector.

We recognize that the harvester must be adapted to various growths of potato vines in different geographical localities and accordingly, we provide a number of adjustments for the potato vine stripping mechanism as shown more particularly in Fig. 13. In this arrangement the brackets 29 and 30 instead of being permanently secured to the frame members 27 and 28 are each provided with slots which we have shown, for example, at 29a through which securing bolt members 29b attached to the frame member pass. By loosening these bolts the position of the potato vine stripping rolls 32 and 38 with respect to the discharge end of the elevating conveyor 7 may be changed in accordance with the growth of the potato vines so that the rolls may more effectively grip the ends of the vines as they project over the top of the conveyor immediately below the top thereof for stripping the potatoes from the vines. In this arrangement, the slip belt 36 is also provided with an adjustment device in the form of an adjustable rod support 117 carrying roller 118 engageable with slip belt 36. The rod device 117 is slotted at 119 and may be secured in any selected position by means of adjustable screw device 120 for changing the tension on the slip belt 36 as the spacial relation of the set of rolls 32 and 38 is changed with respect to the delivery end of the elevator conveyor 7. As these adjustments are made and positions changed, a corresponding change must be made in the effective length and angular position of the chute corresponding to the fixed chute 61 in Fig. 6. In the arrangement illustrated in Fig. 13, we provide a chute 121 which is pivoted with respect to frames 27 and 28 at 122 and may be changed in angular position by changes in the position of links represented at 123 pivotally connected at 124 to the ends of chute 121 and adjustably connected through slots 125 and set screws 126 with the frame members 27 and 28. The chute 121 is slotted at 127 for the passage of bolt members 128 which extend through the extension portion of the chute represented at 129 so that the extension portion of the chute may be adjusted longitudinally with respect to the chute portion 121 for increasing or decreasing the effective length thereof for receiving the potato vines, debris, stones or undesirable material which may be passed between stripping rollers 32 and 38. The position of the stripping rollers and the chute and the slip belt tensioning device is selected so that the potato harvester may be made effective for meeting a wide variety of conditions existing with the different growths of potato vines in various geographical localities.

Thus, it will be readily seen that by virtue of the employment of the canvas or flexible conveyors 60 and 93 and the coaction of the pliable surface 88 of roller member 79, the potatoes emerge clean and free from dirt since they are not damaged, gouged or bruised by contact with metallic cleaning media which often make them unsalable because of rot and spoilage setting in before the potatoes reach the sorting machines. It will be observed that the potatoes are also subjected to a rolling and tumbling action on the canvas conveyor belts 60 and 93 which further removes dirt so that the potatoes emerge relatively free from foreign matter, hence presenting an attractive, marketable appearance.

We have found the structure of our invention highly practical in operation but we realize that modifications and changes may be made in the construction and arrangement of parts and we intend no limitations upon our invention other than may be imposed by the scope of the appended claims.

What we claim as new and desire to secure by Letters Patent of the United States, is as follows:

1. In a potato harvesting machine, a conveyor for elevating potato vines bearing potatoes thereon from the harvesting area, a set of yieldable rolls mounted below the upper end of said conveyor for gripping the potato vines and stripping the potatoes therefrom as the potato vines are advanced over the top of said conveyor, a conveyor disposed beneath said set of rolls for receiving the potatoes stripped from the vines, means for driving said set of rolls, means for advancing said last mentioned conveyor for effecting delivery of potatoes, and means for selectively adjusting the spacial relation of said set of rolls with respect to the upper end of said first mentioned conveyor.

2. In a potato harvesting machine, a conveyor for elevating potato vines bearing potatoes thereon from the harvesting area, a set of yieldable rolls mounted below the upper end of said conveyor for gripping the potato vines and stripping the potatoes therefrom as the potato vines are advanced over the top of said conveyor, a conveyor disposed beneath said set of rolls for receiving the potatoes stripped from the vines, and means for simultaneously driving each of said conveyors and said set of rolls, said last mentioned means including a slip connection drive for said set of rolls whereby stoppage in rotation of said rolls does not influence the continuous drive of said conveyors.

3. In a potato harvesting machine, a conveyor for elevating potato vines bearing potatoes thereon from the harvesting area, a set of yieldable rolls mounted below the upper end of said conveyor for gripping the potato vines and stripping the potatoes therefrom as the potato vines are advanced over the top of said conveyor, a conveyor disposed beneath said set of rolls for receiving the potatoes stripped from the vines, a delivery conveyor mounted in coacting relation to said last mentioned conveyor, said delivery conveyor being inclined upwardly and operating as a sorting table, a potato cleaning roll interposed between the end of said second mentioned conveyor and said delivery conveyor, and means for simultaneously driving said potato cleaning roll, all of said conveyors and said set of rolls.

4. In a potato harvesting machine, a conveyor for elevating potato vines bearing potatoes thereon from the harvesting area, a set of yieldable rolls mounted below the upper end of said conveyor for gripping the potato vines and stripping the potatoes therefrom as the potato vines are advanced over the top of said conveyor, a conveyor disposed beneath said set of rolls for receiving the potatoes stripped from the vines, a delivery conveyor mounted in coacting relation to said last mentioned conveyor, said delivery conveyor being inclined upwardly and operating as a sorting table, a potato cleaning roll interposed between the end of said second mentioned conveyor and said delivery conveyor, means for floatingly journaling said potato cleaning roll and supporting said potato cleaning roll in adjustable spacial relation to adjacent ends of said second mentioned conveyor and said delivery conveyor, and means for simultaneously driving said potato cleaning roll, all of said conveyors and said set of rolls.

5. In a potato harvesting machine, a conveyor for elevating potato vines bearing potatoes thereon from the harvesting area, a set of yieldable rolls mounted below the upper end of said conveyor for gripping the potato vines and stripping the potatoes therefrom as the potato vines are advanced over the top of said conveyor, a conveyor disposed beneath said set of rolls for receiving the potatoes stripped from the vines, a delivery conveyor disposed adjacent the end of said last mentioned conveyor and inclined upwardly therefrom for forming a sorting table, and a chute disposed adjacent the delivery end of said last mentioned conveyor, said chute including oppositely directed inclined delivery surfaces, means for shifting said chute to either of two positions for directing material from the delivery end of said last mentioned conveyor to a position below the conveyor or to a collecting position beyond the end of said conveyor, and means for simultaneously driving all of said conveyors and said set of yieldable rolls.

6. In a potato harvesting machine, a conveyor for elevating potato vines bearing potatoes thereon from the harvesting area, a set of yieldable rolls mounted below the upper end of said conveyor for gripping the potato vines and stripping the potatoes therefrom as the potato vines are advanced over the top of said conveyor, a conveyor disposed beneath said set of rolls for receiving the potatoes stripped from the vines, a delivery conveyor disposed adjacent the end of said last mentioned conveyor and inclined upwardly therefrom for forming a sorting table, a partition extending longitudinally of said last mentioned conveyor for dividing said last mentioned conveyor into separate sections, independent delivery chutes on each side of said partition coacting with the separate sections of said conveyor, and means for simultaneously driving each of said conveyors and said set of rolls.

RALPH S. HERTZLER.
OMAR K. UMBLE.